United States Patent [19]

Wegner

[11] 4,306,751
[45] Dec. 22, 1981

[54] WHEEL COVER MOUNTING BRACKET

[75] Inventor: John A. Wegner, Harper Woods, Mich.

[73] Assignee: Rockwell International Corporation, Pittsburgh, Pa.

[21] Appl. No.: 144,358

[22] Filed: Apr. 28, 1980

[51] Int. Cl.³ .......................... B60B 7/04; B60B 7/06
[52] U.S. Cl. .............................. 301/37 AT; 301/37 S; 403/337
[58] Field of Search .......... 301/37 R, 37 AT, 37 CM, 301/37 H, 37 S, 37 SC, 108 R, 108 S, 108 SC; 24/221 K; 220/246; 292/62; 70/259; 403/337

[56] References Cited
U.S. PATENT DOCUMENTS

| 2,159,881 | 5/1939 | Booth | 301/37 AT |
| 2,756,110 | 7/1956 | Lyon | 301/37 AT |
| 3,248,915 | 5/1966 | Scheiman | 301/37 AT |
| 4,134,489 | 1/1979 | Sabes | 403/337 X |

FOREIGN PATENT DOCUMENTS

| 19297 | 11/1956 | Fed. Rep. of Germany | 301/37 SC |
| 793465 | 4/1958 | United Kingdom | 301/37 SC |

Primary Examiner—Chales A. Marmor

[57] ABSTRACT

An ornamental wheel cover having a funnel shaped member provided with at least three radially projecting tabs. Each of the tabs has a hole therethrough for registration on the threaded studs to which the wheel is fixedly mounted to rotate with the wheel. Nuts positionally lock the radially projecting tabs on the studs wherein the central axis of the funnel shaped member is coincident with the axis of the axle and the locking pin. The funnel shaped member has an intermediate cylindrical portion which terminates in an inwardly flaring conical portion to surround the end of the axle. The conical portion has a slot therethrough for receiving the radially extending pin member when the locking pin is pressed inwardly against the biasing force of the spring. The radially extending pin member engages an outwardly facing detent formed on the inner surface of the conical portion positioned perpendicularly to the slot provided through the conical portion. The detent is semi-circular and has substantially the same radius of curvature as the radially extending pin member such that the locking pin is lockingly positioned when the radially extending pin member comes to rest in the semi-circular detent thereby positively locking the wheel cover to the funnel shaped member.

1 Claim, 4 Drawing Figures

WHEEL COVER MOUNTING BRACKET

BACKGROUND OF THE INVENTION

1. Field of the Invention

This invention, which comprises an improvement on the invention entitled "Wheel Cover", filed by Lawrence Clifford Ladouceur and assigned to the assignee of this application, relates generally to wheel covers and, more particularly, to ornamental wheel covers having positive locking or anti-theft devices associated therewith. More particularly, the invention relates to an ornamental wheel cover having an anti-theft device which will inhibit the unauthorized removal from the vehicle wheel of the cover.

2. Description of the Prior Art

Wheel covers, as with all other automotive components, continue to become more and more expensive and, therefore, a target of theft. The prior art forms of anti-theft devices associated with wheel covers have been particularly difficult to operate or easily subverted. Typical examples of such prior art forms of anti-theft devices associated with automotive wheel covers are as follows:

| | | |
|---|---|---|
| U.S. Pat. Nos. | 1,809,117 | 2,971,798 |
| | 2,108,145 | 3,170,733 |
| | 2,249,568 | 3,336,771 |
| | 2,329,945 | 3,352,133 |
| | 2,535,126 | 3,633,065 |
| | 2,659,229 | 3,833,266 |
| | 2,727,790 | 3,965,708 |
| | 2,847,096 | 3,967,855 |
| | 2,869,929 | |
| Canadian Patent | 603,736 | |
| French Patent | 1,394,398 | |
| British Patents | 327,315 | 1,245,832 |
| | 1,028,861 | |

It can be seen from the above prior art forms of anti-theft devices associated with ornamental wheel covers that they are typically difficult to manufacture, susceptible to the adverse environment associated with wheel covers and generally easy to avoid or subvert.

SUMMARY OF THE INVENTION

Accordingly, it is the primary object of the present invention to provide an ornamental wheel cover for ornamental removable attachment to an automotive wheel which comprises a rim portion having a retention means. The retention means gripingly engages the wheel. A central portion is disposed axially outward from the rim portion and has a central aperture therethrough. The aperture is in axial alignment with the axle upon which the wheel is rotatably mounted. A locking pin is slidably disposed within the aperture. The locking pin has a head portion at its outward facing end and a reduced portion at the inward facing end which terminates in a radially extending pin member. The head portion is positioned outboard of the central portion of the wheel cover and captures a spring means between the central portion and the inward facing radially extending portion of the head portion, in combination with a funnel shaped member provided with at least three radially projecting tabs. Each tab has a hole therethrough for registration on the threaded studs to which the wheel is fixedly mounted to rotate with the wheel. Nuts positionally lock the radially projecting tabs on the studs wherein the central axis of the funnel shaped member is coincident with the axis of the axle and the locking pin. The funnel shaped member has an intermediate cylindrical portion which terminates in an inwardly flaring conical portion to surround the end of the axle. The conical portion has a slot therethrough for receiving the radially extending pin member when the locking pin is pressed inwardly against the biasing force of the spring means. The radially extending pin member engages an outwardly facing detent formed on the inner surface of the conical portion positioned perpendicularly to the slot provided through the conical portion. The detent is semi-circular and has substantially the same radius of curvature as the radially extending pin member such that the locking pin is lockingly positioned when the radially extending pin member comes to rest in the semi-circular detent thereby positively locking the wheel cover to the funnel shaped member and, in turn, to the wheel cover. Each of the radially projecting tabs are positioned on the funnel shaped member such that they lie in the same plane at the base of the cylindrical mid portion and each of these tabs are provided with an axial slot.

Another object of the present invention is to provide an ornamental wheel cover for ornamental removable attachment to an automotive wheel wherein there are three radially projecting tabs.

Still another object of the present invention is to provide an ornamental wheel cover for ornamental removable attachment to an automobile wheel wherein the radially projecting slots are of a width smaller than the diameter of the holes provided in each of the radially projecting tabs.

A further object of the present invention is to provide an ornamental wheel cover for ornamental removable attachment to an automotive wheel wherein the slots in the radially projecting tabs are outwardly facing away from the cylindrical mid portion of the funnel shaped member.

A still further object of the present invention is to provide an ornamental wheel cover for ornamental removable attachment to an automotive wheel wherein there is a concave rim portion surrounding the holes in the radially projecting tabs whose radius of curvature corresponds to the convex surface provided on each of the nuts which positionally lock the radially projecting tabs on the threaded studs.

Still another object of the present invention is to provide an ornamental wheel cover for ornamental removable attachment to an automotive wheel wherein the funnel shaped member has a solid body of revolution.

Another extremely important object of the present invention is to provide an ornamental wheel cover which is inexpensive to manufacture.

Still another important object of the present invention is to provide an ornamental wheel cover which can be manufactured by utilizing high volume automated techniques.

It is still another object of the present invention to provide an ornamental wheel cover which is relatively impervious to the adverse environment typically encountered by wheel covers.

Other objects and advantages of the present invention will become apparent by reading the following specification when considered in conjunction with the attached claims.

DESCRIPTION OF THE PREFERRED EMBODIMENT

Figure 1:
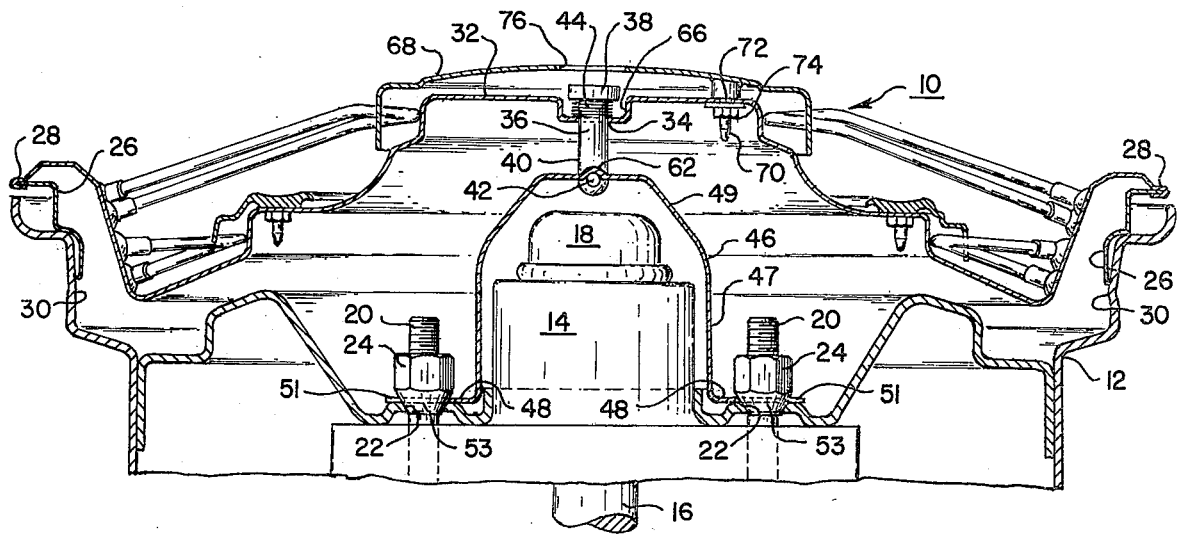
FIG. 1 is a partial sectional view of a wheel cover incorporating the present invention and attached to a vehicle wheel.
Figure 2:
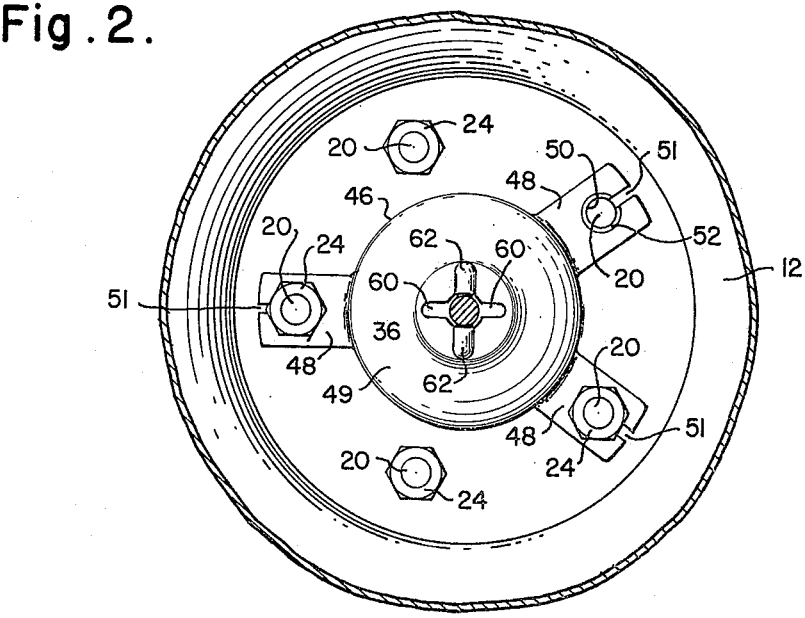
FIG. 2 is a partial top view, with certain parts removed, of the wheel cover vehicle wheel combination of FIG. 1.
Figure 3:
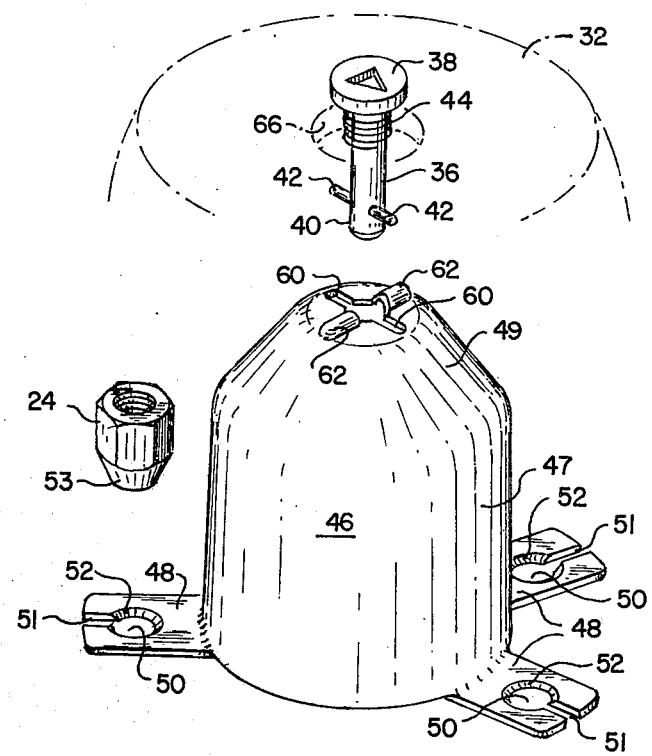
FIG. 3 is a perspective view of the partially unassembled anti-theft device for the wheel cover of FIG. 1.
Figure 3:
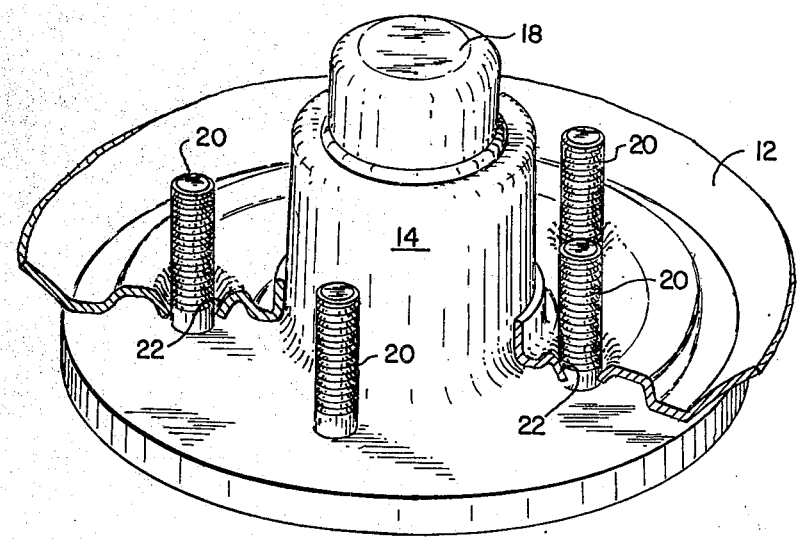
Figure 4:
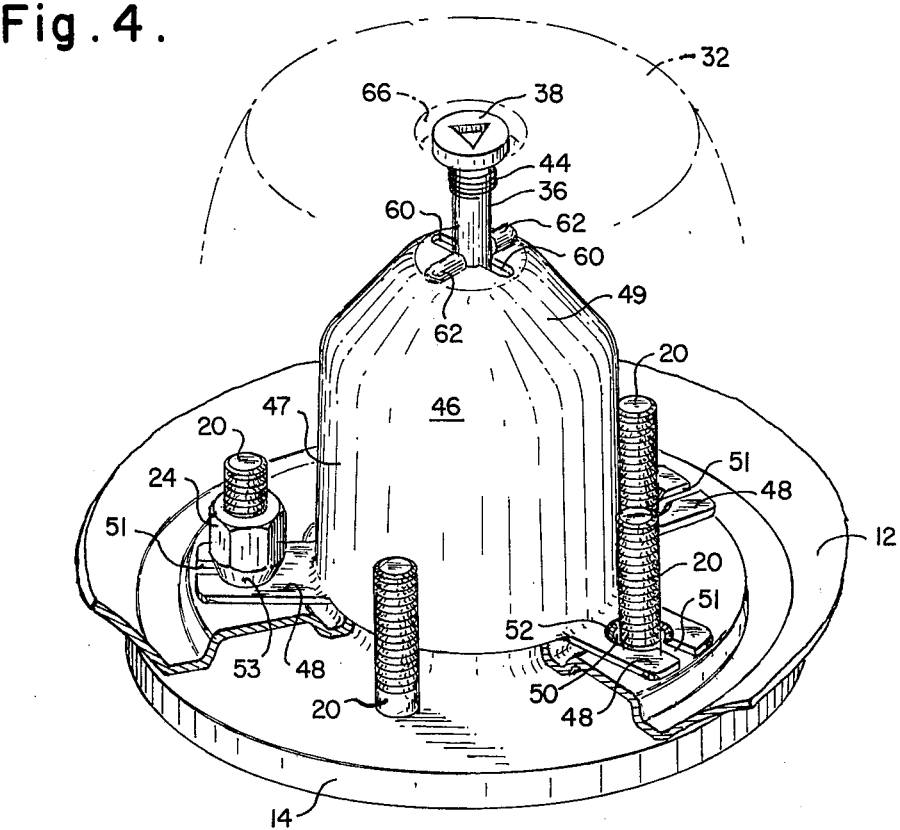
FIG. 4 is a perspective view of the partially assembled anti-theft device for the wheel cover of FIG. 1.

Referring now to the drawings for a better understanding of the invention, there is shown an ornamental wheel cover 10 which is particularly adapted for assembly with an automotive wheel 12. The wheel 12 is a standard automotive wheel which is assembled to a hub 14. The automotive hub 14 is rotatably mounted on an axle 16 by suitable bearings (not shown). The bearings and axle 16 are covered by a cap 18. The wheel 12 is mounted on the hub 14 and is fixedly attached thereto by the provision of threadable studs 20. The studs 20 protrude through and are in registration with holes 22 provided in the radial portion of the wheel 12. Nuts 24 threadedly attach the wheel 12 to the hub 14 as well as perform further functions in a manner to be described below. This arrangement is as typically found in most wheel hub configurations.

The ornamental wheel cover 10 of the present invention may be assembled on the wheel 12 in the common fashion by the provision of retention fingers 26 which are attached to the rim portion 28 of the wheel cover 10. The retention fingers 26, which are resilient, are biased inwardly as the wheel cover 10 is forced axially inward with respect to the wheel 12. Ultimately, the retention fingers grasp and grippingly engage the axial extending face 30 of the wheel 12 for retaining and fixing the wheel cover to the wheel 12. The wheel cover may be of a number of varieties, such as a simulated wire wheel cover or any of the many ornamental and decorative types of wheel covers found in the automotive industry. As before mentioned, these wheel covers are very expensive and highly susceptible to theft. To counter the ever increasing incidents of theft in these wheel covers, an anti-theft device has been provided integrally with the ornamental wheel cover 10 to thwart the unauthorized removal of the wheel cover 10 from the wheel 12. More particularly, the wheel cover 10 includes a central portion 32 which may be formed integrally with the overall wheel cover 10. The central portion 32 is disposed generally axially outward from the rim portion 28 of the wheel cover 10. Forming of the central portion 32 can easily be accomplished during the manufacturing process whether the wheel cover is of stainless steel, aluminum or even plastic. The central portion 32 is provided with a central aperture 34. This aperture 34 is in general alignment with the longitudinal axis of the axle 16 and hub 14. The anti-theft device further generally includes a locking pin 36 which is slidably disposed within the aperture 34. The locking pin can be manufactured from a wide range of suitable material such as steel. The locking pin 36 is provided with a head portion 38 at its outward facing end and a reduced portion 40 at its inward facing end. The reduced portion terminates in a radially extending pin member 42. The locking pin 36, as before mentioned, may be manufactured from suitable materials. It should be noted for manufacturing convenience that the locking pin may be manufactured from several different materials and assembled to form a single unitary member as, for example, the head portion 38 as well as the shank 40 may be manufactured from plastic while the radially extending pin member 42 could be manufactured from suitable steel.

As can be seen in the drawings, the head portion 38 of the locking pin 36 is resiliently biased outward by a spring 44. The spring 44 may be a typical helically wound steel spring.

The anti-theft device associated with the ornamental wheel cover 10 of the present invention further includes and comprises a funnel shaped member 46 which may be manufactured from a wide range of material such as sheet steel or the like. The funnel shaped member 46 is provided with radially projecting tabs 48 at its wide end. The radially projecting tabs 48 are provided with apertures or holes 50. These holes 50 are so provided for registration on the threaded studs 20. The threaded studs 20, as before, mentioned , are the studs used to fasten the mountable wheel 12 to the hub 14. The holes 50, when in registration with the studs 20, may be captured thereon by nuts 24. There may be provided three such radially projecting tabs 48 and these tabs may be positioned at the base of the cylindrical portion of the funnel shaped member 46. Further, the radially projecting tabs 48 are so positioned on the funnel shaped member 46 such that they are in the same radial plane. Each radially projecting tab 48 is provided with a radially outwardly facing slot 51 which allows the tab 48 to expand as the nuts 24 are torqued on the threadable studs 20. In this manner, the radially projecting tabs 48 will tend to expand as the nuts 24 are torqued on the studs 20 without interfering with the proper fastening of the wheel 12 to the hub 14. The funnel shaped member 46 is, therefore, ridgly and fixedly attached to the rotating wheel 12. The funnel shaped member 46 is so positioned that its longitudinal axis is coincident with the longitudinal axis of the axle 16 and the locking pin 36. The funnel shaped member 46 has a cylindrical mid body 47 and terminates in a truncated conical portion 49. The conical portion 49 of the funnel shaped member 46 may be formed integrally with the funnel shaped member 46 Each of the radially projecting tabs 48 may be provided with a concave rim portion 52 which surrounds the holes 50. The concave rim portion 52 has a reduced curvature which corresponds to the convex surface 53 which is provided on the downward facing portion of each of the nuts 24 which positionally lock the radially projecting tabs 48 on the threaded studs 20. The width of the slot 51 is such, as before mentioned, to allow the expansion of the radially projecting tabs 48 and yet capture the tabs 48 between the nuts 24 and the wheel 12. The width of the slot is, therefore, less then the diameter of the threaded studs 20. Accordingly, it can be seen from the above that the funnel shaped member 46 is so attached to the wheel 12-hub 14 combination without the use of additional attachment means and yet does not interfere with the proper torquing of the nuts 24 upon the threaded studs 20. In that regard, the funnel shaped member 46 may be a rigid member having a solid body of revolution around and about the end of the axle 16 and the hub 14 rotatably carried thereon. The conical portion 49 faces outwardly from the end of the axle 16 and effects the means for attaching the wheel cover 10 to the wheel assembly. As before mentioned, the retention fingers 26 provide the primary means of attaching the wheel cover 10 to the wheel 12. An additional locking or anti-theft device, which is the subject of the present invention, may be considered as a secondary means of attaching the wheel cover 10 to the wheel 12 with the primary emphasis being anti-theft. The conical portion 49 is provided with a slot 60 therethrough. The center of the slot 60 is coincident with the longitudinal axis of the funnel shaped member 46. The slot 60 is formed in the conical portion 49 to accept the radially extending pin member 42 of the locking pin 36. Further, the conical portion 49 defines a semi-circular detent 62 which is generally perpendicular to the slot 60 formed in the conical portion 49. The semi-circular detent 62 has a radius of curvature coincident with the radius of curvature with the radius of curvature of the radially extending pin member 42 such that it intimately embraces the outer surface of the radially extending pin member 42. Typically, the perpendicularly positioned detent would be formed from the same material as the conical portion 49 but could also be a separate member such as a plastic member attached to the inner surface of the conical portion 49 (not shown). Accordingly, when the locking pin 36 is depressed in a longitudinal fashion against the spring pressure of the spring 44, the radially extending pin member 42 will pass through the plane of the conical portion 49, through the slot 60 to the interior of the conical portion 49. Thereafter, when the locking pin 36 is rotated about its axis, the radially extending pin member 42 will be rotated to become in alignment with the semi-circular detent 62 and will be so held in place therein by the spring pressure of the spring 44. A special tool (not shown) could be adapted to effect the depression and rotation of the locking pin 36. The anti-theft feature of the present invention could be enhanced by the provision of a special head portion 38 which would accept only a special tool for manipulating the locking pin 36.

The silhouette of the central portion 32 of the wheel cover 10 could be functionally enhanced by the recessing of the locking pin 36. Accordingly, a centrally disposed inwardly projecting depression 66 may be provided thereon with the aperture being centrally disposed therein at the base thereof. What is meant, in part, by the functional enhancement is that the locking pin 36 will be carried in such a manner on the wheel cover 10 so that its head portion will be generally n line with the plane of the central portion 32 when the locking pin 36 is in its locked position.

In addition, the wheel cover 10 may be provided with a cover plate 68 which is fixedly attached to the central portion 32 of the wheel cover 10. Various means could be used to attach the cover plate 68. One such embodiment may include the provision of integrally formed studs 70 provided on the interior surface of the cover plate 68 for registration with a series of hols 72 provided in the central portion 32 radially outward of the depression 66. These studs 70 may be formed integrally with the cover plate particularly in the case where the cover plate 68 is a plastic material or may be threaded into bosses provided on the interior surface of the cover plate 68. Nuts 74 are threadedly attached to the studs 70 to fixedly secure the cover plate 68 to the central portion 2. The cover plate 68 is further provided with a central aperture 76 to provide access to the locking pin 36. The central aperture which is in alignment with the locking pin 36 may be further provided with a suitable decorative closure member which maintains the interior surface between the cover plate 68 and the locking pin 36 secure and clean from the outside environment.

It should be noted that the hub 14-axle 16 configuration, as depicted on the attached drawings, is generally typical of a steering axle-hub configuration. The present invention is also applicable to a drive axle-hub configuration.

While it is apparent that the invention herein disclosed is well calculated to achieve the benefits and advantages as hereinabove set forth, it will be appreciated that the invention is susceptible to modification, variation and change without departing from the spirit thereof.

I claim:

1. An ornamental wheel cover for ornamental removable attachment to an automotive wheel comprising: a rim portion having a retention means, said retention means gripingly engaging said wheel; a central portion disposed axially outward from said rim portion having a central aperture therethrough, said aperture in axial alignment with the axle upon which said wheel is rotatably mounted; a locking pin slidably disposed within the aperture, said locking pin having a head portion at its outward facing end and a reduced portion at the inward facing end terminating in a radially extending pin member; said head portion positioned outboard of said central portion of said wheel cover and captures a spring means between said central portion and the inward facing radially extending portion of said head portion, in combination with a funnel shaped member provided with at least three radially projecting tabs, each said tabs having a hole therethrough for registration on the threaded studs to which the wheel is fixedly mounted to rotate with said wheel; nuts positionally locking said radially projecting tabs on said studs wherein the central axis of said funnel shaped member is coincident with said axis of said axle and said locking pin; said funnel shaped member having an intermediate cylindrical portion which terminates in an inwardly flaring conical portion to surround the end of said axle, said conical portion having a slot therethrough for receiving said radially extending pin member when said locking pin is pressed inwardly against the biasing force of said spring means, said radially extending pin member engaging an outwardly facing detent formed on the inner surface of said conical portion positioned perpendicularly to said slot provided through said conical portion, said detent being semi-circular and having substantially the same radius of curvature as said radially extending pin member such that said locking pin is lockingly positioned when said radially extending pin member comes to rest in said semi-circular detent whereby positively locking said wheel cover to said funnel shaped member and, in turn, to said wheel member; each said radially projecting tabs are so positioned on said funnel shaped member such that they lie in the same plane at the base of the cylindrical mid portion; and each of said radially projecting tabs provided with an axial slot, there being three radially projecting tabs; said radially projecting slots are of a width smaller than the diameter of said holes provided in each of said radially projecting tabs, said slots in said radially projecting tabs are outwardly facing away from said cylindrical mid portion of said funnel shaped member; a concave rim portion surrounding said holes in said radially projecting tabs whose radius of curvature corresponds to the convex surface provided on each of said nuts which positionally lock said radially projecting tabs on said threaded studs; said funnel shaped member is a rigid member having a solid body of revolution.

* * * * *